(12) United States Patent
Mistele

(10) Patent No.: US 6,908,682 B2
(45) Date of Patent: Jun. 21, 2005

(54) PHOTOCURED SILICONE SEALANT HAVING IMPROVED ADHESION TO PLASTIC

(75) Inventor: Chad D. Mistele, Leander, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 81 days.

(21) Appl. No.: 10/242,098

(22) Filed: Sep. 12, 2002

(65) Prior Publication Data

US 2004/0053059 A1 Mar. 18, 2004

(51) Int. Cl.$^7$ ................................ B32B 25/20
(52) U.S. Cl. ...................... 428/447; 528/31; 528/32; 528/12
(58) Field of Search .................. 428/447; 528/31, 528/32, 12

(56) References Cited

U.S. PATENT DOCUMENTS

| | | | |
|---|---|---|---|
| 3,020,260 A | * | 2/1962 | Nelson ........................ 528/15 |
| 4,337,332 A | | 6/1982 | Melancon et al. |
| 4,510,094 A | | 4/1985 | Drahnak |
| 4,511,620 A | | 4/1985 | Kroupa et al. |
| 4,530,879 A | | 7/1985 | Drahnak |
| 4,600,484 A | | 7/1986 | Drahnak |
| 4,824,390 A | | 4/1989 | Crane et al. |
| 4,916,169 A | | 4/1990 | Boardman et al. |
| 5,059,484 A | | 10/1991 | Clark et al. |
| 5,079,300 A | | 1/1992 | Dubrow et al. |
| 5,099,088 A | | 3/1992 | Usami et al. |
| 5,132,494 A | | 7/1992 | Burton et al. |
| 5,145,886 A | | 9/1992 | Oxman et al. |
| 5,466,532 A | | 11/1995 | Wengrovius et al. |
| 5,606,149 A | | 2/1997 | Yaworski et al. |
| 5,741,552 A | | 4/1998 | Takayama et al. |
| 5,934,934 A | | 8/1999 | Ward |
| 5,975,945 A | | 11/1999 | Daoud |
| 5,985,462 A | | 11/1999 | Herzig et al. |
| 6,004,679 A | | 12/1999 | Mitchell et al. |
| 6,046,250 A | | 4/2000 | Boardman et al. |

FOREIGN PATENT DOCUMENTS

| | | |
|---|---|---|
| EP | 0 398 701 B1 | 5/1995 |
| EP | 0 561 893 B1 | 9/1996 |
| EP | 0 903 378 A1 | 3/1999 |
| JP | 61 162561 | 7/1986 |

OTHER PUBLICATIONS

Mayer, T.; Burget, D.; Mignani, G.; Fouassier, J.P.—Photohydrosilation Reaction of Silicone Polymers, Platinum Based Photocatalysts—J. Polymer Science, Part A: Polym. Chem. vol. 34, No. 15, pp. 3141–3146—1996.

* cited by examiner

Primary Examiner—Kuo-Liang Peng
(74) Attorney, Agent, or Firm—James J. Trussell

(57) ABSTRACT

A curable composition for use as a sealant, in which the curable composition comprises a silicone fluid in an amount from about 80 wt % to about 90 wt %, a vinyl group containing polyorganosiloxane in an amount from about 10 wt % to about 20 wt %, a hydrogen containing polysiloxane in an amount from about 0.5 wt % to about 2.0 wt %, and a hydrosilation photocatalyst in an amount from about 5 ppm to about 100 ppm. The sealant cures in about 1 second to about 20 seconds during reaction of the vinyl group containing polydiorganosiloxane and the hydrogen containing polysiloxane, by exposure to ultraviolet radiation, in the presence of the hydrosilation photocatalyst. The sealant has an adhesion force to plastic from about 2.0 N/100 mm to about 4.0 N/100 mm.

2 Claims, 1 Drawing Sheet

PHOTOCURED SILICONE SEALANT HAVING IMPROVED ADHESION TO PLASTIC

BACKGROUND OF THE INVENTION

1. Field of the Invention

The invention relates to gelled polymers and measurement of adhesion of such polymers to surfaces including plastic surfaces of connectors for cables and wires that form telecommunications and power distribution networks. More particularly this invention relates to photocurable organopolysiloxane sealing gel compositions and an apparatus for measuring the strength of the adhesive bond of cured sealing gels to plastic.

2. Description of the Related Art

Many of the technologies available to modern society find their origin in the application of electricity and electronics. The driving force of electricity coupled with the versatility of electronics has produced, for example, the communications, automation and computer industries. There are many specialized fields associated with each of these industries. Communications may be divided into space and satellite communications, commercial radio and television, data communications, navigation systems, radar and police and aircraft communications, to name but a few. A common feature of these communication systems is the development of networks linking together a multitude of transmitting and receiving sites. Network links may be hard wired or in the form of radio signals, with most communications systems requiring both types. Much of the infrastructure of communication networks exists in open environments at the mercy of inclement weather and climatic events including rain, hail, and snow storms. Electricity distribution networks and telephone communications networks are particularly vulnerable to erratic changes in climate. Some network components, such as cables and wire connectors may be particularly susceptible to attack that interferes with network and signal integrity in adverse weather conditions. Attack of network connectors by contaminants takes a variety of forms of which ingress of liquids or moisture is one of the most common. The presence of seams or gaps in a connector will provide access to moisture and other liquid contaminants that could compromise network integrity by causing a short circuit. For this reason, it has become common to use sealed connectors at relatively unsheltered network connecting sites, such as those used by telephone companies to provide service from the telephone line twisted pair to an individual household. The network to home connection typically resides inside an enclosure or pedestal box mounted at ground level, and exposed to the elements.

Evidence of the benefits of sealed connectors in telecommunications networks is given in U.S. Pat. No. 5,975,945 describing a network interface device (NID) between a cable and a local network including a number of telephones. A conventional 5-pin plug-in protector provides electrical isolation when inserted in the NID to form electrical connections. Water resistant gel, applied to each plug-in protector, forms a water-resistant seal to inhibit moisture penetration into the protector, thereby allowing it to be used outdoors, even though, under conventional NID specifications, plug-in protectors are limited to indoor applications and special potted protectors are required for outdoor use.

U.S. Pat. No. 5,079,300 addresses the use of gel sealants that also prevent corrosion of e.g. connectors used in telecommunications networks. Suitable gel materials include silicone compositions that environmentally seal and protect substrates such as electrical connections, bare electrical conductors and electrical splices.

Requirements for gel sealants include the need to protect and insulate electrical connections and splices at temperatures that could vary from about −40° C. to about 60° C. or more. Gel sealants should provide moisture and watertight containment for wire junctions as well as preventing rodent and insect damage. The need to reenter a pedestal box to alter or repair wires, and connections between wires, requires that cured gels withstand considerable and repeated deformation during making and breaking of connections, for example, to modify service to a consumer or to re-route a telephone signal. It should be possible to insert and withdraw connecting wires without significant transfer of gel sealant to the bare wire or loss of sealant from the socket from which the wire is withdrawn. It is desirable that gel sealants, meeting these requirements, possess high elasticity and elongation related to high deformability. Suitable materials have higher cohesive strength than adhesive strength yet maintain sufficient adhesion to connector surfaces that the gel remains substantially within the connector during retermination. Hydrolytic stability and stability against thermal and oxidative degradation lower the probability of gel mass shrinkage, which could open up channels for ingress of moisture and fluid contaminants.

Known gel materials, for use in wire and cable connectors, include those derived from polyurethane and silicone polymers as revealed in U.S. Pat. No. 5,934,934 describing a gel filled connector for connecting electrical wires. The connector includes a housing to receive a plug that includes connecting contacts. A colloidal gel, of either polyurethane or silicone may be used in the housing to provide environmental protection for connectors, such as telephone jacks. Connectors wrapped with cured strips of sufficiently cohesive gel provide further protection. As an added feature, the colloidal gel contains particles that will absorb electromagnetic radiation.

U.S. Pat. No. 4,824,390 describes an electrical connector, especially for telecommunications, including an electrical insulating block having an array of cavities filled with an electrically insulating silicone gel surrounding electrical connections and contacts disposed in each of the cavities. The gel is deformable and penetrable at ambient temperatures to allow insertion of external electrical contacts into cavities to enable formation of electrical connections with the contacts in the cavities.

Recent developments of cured polymer compositions led to a preference for silicone materials that provide gel structures for filling or covering connectors of the types described previously. Connector cavities may first be filled with curable compositions that cure to gels when heated at elevated temperature. Information relating to thermally cured silicone compositions may be found in a number of references including U.S. Pat. No. 4,337,332 disclosing a latently curable organosilicone composition stabilized against premature gelation by the presence of an amount of an unsaturated amide that is sufficient to inhibit gelation of the composition at low, ambient or room temperature but insufficient to prevent hydrosilation at an elevated temperature. U.S. Pat. No. 4,511,620 describes an organosiloxane gel that cures by a hydrosilation reaction when heated.

Thermal curing involving a hydrosilation mechanism is known for providing silicone coatings and adhesives as described in U.S. Pat. No. 5,741,552, U.S. Pat. No. 5,466, 532 and U.S. Pat. No. 6,004,679. Such materials typically comprise a vinyl-terminated polydiorganosiloxane; a hydrogen-substituted polydiorganosiloxane; and a hydrosilation catalyst. U.S. Pat. No. 5,059,484 describes gum-type organosiloxane elastomers having increased adhesion to organic polymer substrates following thermal curing using a platinum-catalyzed hydrosilation reaction in the presence of an amount of silanol-functional polydiorganosiloxane.

A disadvantage of thermally cured gels is the need for curable compositions to withstand elevated temperatures during conversion to cured polymer. Also, key reactants typically require separation into two parts to be mixed together just prior to curing. A reaction inhibitor may be required to prevent premature crosslinking after mixing in the presence of a thermally activated hydrosilation catalyst. Some of these problems may be avoided using curable compositions including a photoreactive hydrosilation catalyst rather than its thermally activated counterpart.

Previous studies described in U.S. Pat. No. 4,510,094, U.S. Pat. No. 4,530,879, U.S. Pat. No. 4,600,484, U.S. Pat. No. 4,916,169, U.S. Pat. No. 5,145,886, U.S. Pat. No. 6,046,250, EP 398,701, EP 561,893 and Mayer et al (J. Polymer Sci., Part A: Polymer Chem.; Vol. 34, No. 15, p. 3141–3146 (1996)) reveal the use of hydrosilation photocatalysts for curing silicone compositions containing vinyl and hydrosilyl functionality. There is nothing to suggest application of photocured silicone compositions as coatings or gels suitable for protecting connectors used in electrical networks.

Mayer et al (J. Polymer Sci., Part A: Polymer Chem.; Vol. 34, No. 15, p. 3141–3146 (1996)) presents findings from investigating trimethyl (β-dicarbonyl) Pt (IV) complexes as alternatively useful photocatalysts for the radiation-activated hydrosilation of silicone polymers. Typical silicone compositions were given as Si—H/Si-vinyl (SiH:Vi) molar ratio of 1.7 of two commercial silicones RP1 and RP2 with catalyst added to obtain 250–300 ppm elemental platinum in the mixture. Films were deposited with a controlled thickness of 20–25 µm on a KBr crystal window and exposed to the filtered HPK125W (UV) light from a medium pressure UV lamp. Disappearance of the Si—H frequency was followed using IR spectroscopy. The paper gives no information concerning protective sealing gels.

The previous discussion shows that gel sealants may be used for environmental protection of connector systems used in electrical and electronic networks. Room temperature curing and elevated temperature curing of silicone-based gel compositions are known, including those curing via a hydrosilation mechanism. Both thermal catalysts and photocatalysts have been described for promoting hydrosilation during curing of polysiloxane compositions. Regardless of information available concerning preparation and curing of polysiloxane compositions for a variety of applications, a need still exists for improved adhesion of cured polymers to organic resins that may be selected as molding materials for wire conductors and optical fiber connecting plugs and sockets used in network interface devices. Sealing gels with improved adhesion extend the lifetime of interconnect devices because they are less susceptible to displacement from connector sockets by repeated insertion and removal of plug elements.

SUMMARY OF THE INVENTION

The present invention satisfies the need for sealant compositions having improved adhesion to organic resins that may be selected as molding materials for connector plugs and sockets used to interconnect components. Sealing gels having improved adhesion to plastic resins increase the service life of wire and cable connectors because of better retention of the sealant within a connector body. Improvements in adhesion have been realized using photocurable silicone compositions. Photocurable silicone compositions according to the present invention rely upon a curing reaction wherein a hydrosilation photocatalyst promotes crosslinking between vinyl and hydrosilyl groups pendant to the silicone backbone. Hydrosilation photocatalysts strongly absorb ultraviolet radiation. A suitable range of photocatalyst concentrations provides curable silicone compositions that cure rapidly to highly viscous sealants suitable for sealing network connections from environmental attack.

Photocurable compositions according to the present invention preferably contain a mixture or blend of fluid polysiloxane polymers substantially free from solvent. Compositions may be cured by formation of crosslinks between polymer chains via a hydrosilation reaction. This reaction requires a combination of polysiloxanes that includes polymers having vinyl functionality with polymers including hydrosilyl groups to provide a molar ratio of vinyl:hydrosilyl from about 1:10 to about 1:12.5. Suitable classes of silicone polymer include vinyl terminated polydimethylsiloxanes, and methylhydrosiloxane-dimethylsiloxane copolymers.

Silicone compositions according to the present invention cure by crosslinking upon exposure to ultraviolet radiation in the presence of a hydrosilation photocatalyst. Preferred hydrosilation photocatalysts include organometallic complexes of platinum, particularly cyclopentadienyltrimethylplatinum and bisacetylacetonateplatinum.

More particularly, the present invention provides a curable composition for use as a sealant, in which the curable composition comprises a silicone fluid in an amount from about 80 wt % to about 90 wt %, a vinyl group containing polyorganosiloxane in an amount from about 10 wt % to about 20 wt %, a hydrogen containing polysiloxane in an amount from about 0.5 wt % to about 2.0 wt %: and a hydrosilation photocatalyst in an amount from about 5 ppm to about 100 ppm. The connector sealant cures in about 1 second to about 20 seconds during reaction of the vinyl group containing polydiorganosiloxane and the hydrogen containing polysiloxane in the presence of the hydrosilation photocatalyst. The sealant has adhesion to plastic from about 2.0 Newtons/100 mm to about 4.0 Newtons/100 mm.

Definitions

The following definitions clarify the meaning of terms used to describe the present invention.

The terms "photopolymerization" or "photocuring" or the like, as used herein, describe crosslinking of curable compositions using a catalyzed reaction involving a photocatalyst.

Terms such as "catalyst," "photocatalyst" and "hydrosilation photocatalyst" refer to substances of which a small proportion notably affects the rate of a chemical reaction without the catalyst itself being consumed. Catalyst concentrations may be stated as wt %, or as parts per million (ppm) for greater accuracy.

The term "photothermocurable" refers to coating compositions that cure by exposure to suitable actinic radiation optionally followed by heating for full crosslinking.

Terms such as "sealant," "high viscosity sealant," "sealing gel" and the like may be used interchangeably to refer to the product of crosslinking a curable composition using either a thermally activated hydrosilation catalyst or a hydrosilation photocatalyst.

Unless stated otherwise concentrations of components are stated in terms of percent by weight (wt %) of solvent-free compositions.

BRIEF DESCRIPTION OF THE DRAWINGS

Notwithstanding any other forms, which may fall within the scope of the present invention, preferred forms of the invention will now be described, by way of example only, with reference to the accompanying drawings in which.

DETAILED DESCRIPTION OF THE INVENTION

Figure 1:
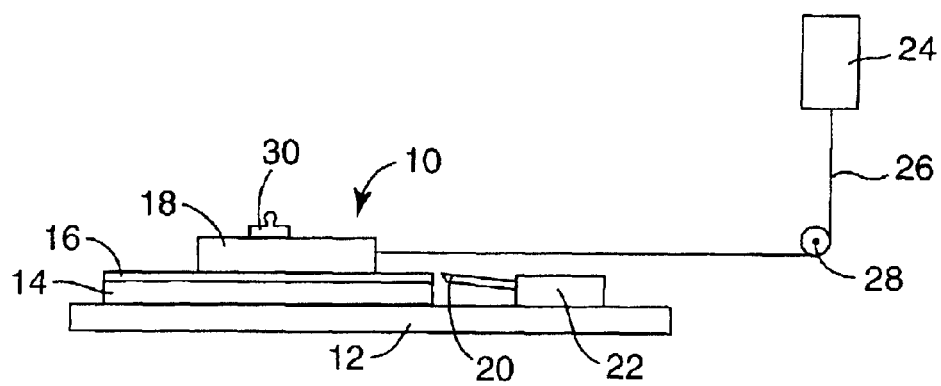
FIG. 1 is a schematic side view of an apparatus useful for measuring adhesion of highly viscous gelled polymers to planar surfaces.

Curable silicone compositions described herein do not cure prematurely even though they contain reactive components and the hydrosilation photocatalyst required to cure such compositions. This allows injection of a consistent viscosity composition on to connector plugs and into connector sockets in advance of "on-demand" gel formation. On-demand gel formation means that the curing reaction to produce highly viscous sealants may be delayed pending exposure to a suitable source of actinic radiation. For example, exposure of the curable composition to a source of ultraviolet radiation provides a suitable dose of energy to initiate a crosslinking reaction to cure the composition to the desired viscous state. In some situations, heat may be used to accelerate the curing reaction.

Photocurable fluid polysiloxane compositions according to the present invention comprise a substantially linear olefinic group containing polydiorganosiloxane, an organohydrogenpolysiloxane crosslinking agent and a hydrosilation photocatalyst provided as a complex compound of a noble metal such as platinum and palladium. The substantially linear olefinic group containing polydiorganosiloxane of the photocurable polysiloxane composition may be any polysiloxane polymer that contains the requisite olefinic groups. A preferred olefinic group containing polydiorganosiloxane includes alkenyl terminal groups and has the following general formula wherein the terminal alkenyl groups are preferably vinyl or allyl. Other alkenyl radicals include any aliphatic unsaturated radicals such as butenyl, hexenyl, octenyl, and pentenyl and the like that react with silicon-bonded hydrogen atoms.

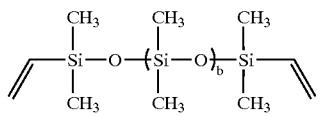

Alkenyl terminated dimethylpolysiloxane

The length of the polymer chain depends upon the number of repeating units represented by the letter "b," which corresponds to liquid polysiloxanes having a viscosity from about 10 centipoise to about 5,000,000 centipoise, preferably about 1000 centipoise to about 250,000 centipoise at 25° C.

Any organohydrogenpolysiloxane may be used as a crosslinking agent for photocurable compositions according to the present invention. Suitable materials contain at least three silicon-bonded hydrogen atoms per molecule. They may be selected from organohydrogenpolysiloxane homopolymers, copolymers and mixtures thereof, which may contain units selected from dimethylsiloxane units, methylhydrogensiloxane units, dimethylhydrogensiloxane units, trimethylsiloxane units and siloxy units. Some examples of organohydrogenpolysiloxanes include polymethylhydrogensiloxane cyclics, copolymers of trimethylsiloxy and methylhydrogensiloxy units, copolymers of dimethylhydrogensiloxy units and methylhydrogensiloxy units, copolymers of trimethylsiloxy, dimethylsiloxy and methylhydrogensiloxy units, and copolymers of dimethylhydrogensiloxy, dimethylsiloxy and methylhydrogensiloxy units.

Preferred polysiloxanes include silicone oils including BAYSILONE fluids M40–M899 (available from GE/Bayer Silicones GmbH, Leverkusen, Germany), vinyl substituted polysiloxanes e.g. SILOPREN U65 (available from GE/Bayer Silicones, Ekrath, Germany), and hydrogen substituted polysiloxanes e.g. HMS-301R (available from Gelest Inc., Morrisville, Pa.).

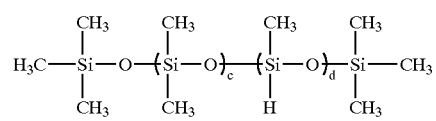

HMS-301R - Hydrogen substituted polysiloxane

Sealant formulations according to the present invention include varying molar ratios of about 1:10 to about 1:12.5 of alkenyl-terminated polydimethylsiloxanes to hydride-containing polysiloxane crosslinkers. Preferred compositions contain an amount of organohydrogenpolysiloxane sufficient to provide from about 10 to about 12 silicon-bonded hydrogen atoms per alkenyl radical.

Photocatalysts suitable for curing polysiloxane compositions according to the present invention include catalysts effective in initiating or promoting a hydrosilation cure reaction. Such a catalyst is referred to herein as a noble or precious metal photocatalyst or a hydrosilation photocatalyst. Materials of this type include ($\eta^5$-cyclopentadienyl)trialkylplatinum complexes as described in U.S. Pat. No. 4,510,094, ($\eta$-diolefin)($\sigma$-aryl)platinum complexes similar to those in U.S. Pat. No. 4,530,879 and $\beta$-diketone complexes of palladium (II) or platinum (II), such as platinum acetyl acetonate (U.S. Pat. No. 5,145,886). Preferred precious metal hydrosilation photocatalysts include bis-acetylacetonate platinum (II) [Pt(AcAc)$_2$] and ($\eta^5$-cyclopentadienyl)trimethylplatinum [Pt CpMe$_3$]. These hydrosilation photocatalysts, when included in photocurable polysiloxane compositions at concentrations between about 5 ppm and about 100 ppm, remarkably cure sealants applied to polycarbonate slabs in a few seconds.

Polysiloxane compositions using UV curing, in the presence of hydrosilation photocatalysts, show improvements in the rate of curing and adhesion to connector bodies when compared to polysiloxane compositions that cure to gel consistency when heated in the presence of a thermal hydrosilation catalyst. Compositions exposed to wavelengths from about 240 nm to about 275 nm cure in about 2 seconds to about 20 seconds using precious metal hydrosilation photocatalysts.

Preferably, the present invention uses unfilled sealant compositions. Other additives, including radiation sensitizers, reaction inhibitors, reinforcing agents and flow control agents, may optionally be used provided they do not interfere with curable composition transparency to activating radiation.

The present invention includes a process for injecting curable polysiloxane compositions into connector cavities at approximately the same time as exposing them to ultraviolet radiation to initiate curing to a highly viscous condition. Direct exposure to ultraviolet radiation was needed to cure silicone compositions in a desired amount of time using radiation sources identified herein. Improved curing may require a change in spectral output of the light source. Another solution to this problem may be the use of an energy transfer agent that absorbs energy passing through the polycarbonate body of a conventional connector and then re-emits the energy at a wavelength that activates a catalyst used to crosslink a silicone.

A more successful, curing process involved a curable polysiloxane composition exposed to ultraviolet radiation through the body of a polypropylene syringe, before release from the end of an injection needle for delivery into a connector cavity. Preferred compositions containing from about 8 ppm to about 80 ppm hydrosilation photocatalyst continued to cure, after exposure to ultraviolet radiation and injection into a connector cavity, to yield a gelled sealant filled cavity in about 5 seconds. Optimization of the rate of viscosity increase depends upon several factors including, the distance between the ultraviolet lamp and the syringe, the speed of injecting the curable composition into the connector cavity and the power and type of the ultraviolet radiation source.

Comparison between polysiloxane compositions cured either by heat or ultraviolet radiation, and differing only in hydrosilation catalyst shows some advantages of using compositions containing a hydrosilation photocatalyst. A noticeable initial advantage is the conversion from a two-part composition to a one-part composition. The two-part composition keeps reactive siloxane materials separate from a thermally activated hydrosilation catalyst. Although generally effective at elevated temperature, a thermally activated hydrosilation catalyst causes some curing even at room temperature. As currently practiced, an additional precaution is the addition of an inhibitor to a two-part composition to moderate the onset of the curing reaction when heating a curable composition.

Replacement of a thermally activated hydrosilation catalyst by a hydrosilation photocatalyst allows all the components of a curable composition to be mixed and stored in a single container. The resulting formulated material is substantially stable to temperature variation and does not normally require addition of an inhibitor. One-part curable compositions may be handled and processed without change in physical characteristics, usually in the form of dispensable fluids, before exposure to ultraviolet radiation. Optional use of an inhibitor may occur if curable compositions require either storage or transportation for extended periods of time.

It was further discovered that sealants produced by one-part curable compositions, using a hydrosilation photocatalyst, adhere more strongly to organic resins used to mold connectors for e.g. network interconnection devices. Better adhesion leads to less loss of sealant from cavities or sockets filled with the sealant. Measurement of adhesion values revealed improvement of attachment of sealant material, to polycarbonate and polybutylene terephthalate surfaces, that was from about three times to about twenty times greater than values measured for sealants cured using a thermally activated hydrosilation catalyst. Adhesion results were also less variable using a hydrosilation photocatalyst.

Experimental

Preparation of Curable Compositions

Compositions according to the present invention comprise a mixture of a vinyl terminated polydimethylsiloxane a methylhydrosiloxane-dimethylsiloxane copolymer and a polydimethylsiloxane oil having trimethylsilyl terminal groups. Addition of a catalyst, such as a platinum-containing hydrosilation photocatalyst, provided a curable composition that cured to a highly viscous sealant during exposure to suitable actinic radiation. A brown glass vessel was used to prepare the mixture. The colored container protects the curable composition from exposure to activating radiation. After mixing until homogeneous, the compositions were degassed under high vacuum prior to exposure to ultraviolet radiation for conversion to cured sealants.

Ultraviolet Exposure Equipment

Sealant compositions were exposed directly to ultraviolet radiation using either an ultraviolet lamp identified as RC250B that provided pulsed ultraviolet radiation at a wavelength of 250 nm (available from Xenon Corporation, Woburn, Mass.), or an EFOS ULTRACURE 100SS ultraviolet lamp (EFOS Inc. is now EXFO Photonic Solutions of Mississauga, Ont., Canada). Either lamp placed at a distance of about 1.0 cm to about 4.0 cm from a container gave sufficient ultraviolet radiation to convert curable silicone compositions into sealing gels. Exposure through the walls of the container gave cured sealants in times of about 1 second to about 20 seconds. Preferably curing was initiated in a syringe to which the curable composition was transferred before injection into connector cavities in which the compositions continued to cure to the condition of a highly viscous sealant as required by the present invention.

Hydrosilation Photocatalysts

Photocatalysts E, F, G and H were synthesized as described in U.S. Pat. No. 4,510,094 and U.S. Pat. No. 4,530,879 (structures below) and are strongly UV absorbing. COD represents a cyclooctadienyl ligand.

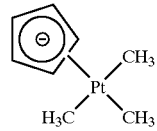

Photocatalyst E

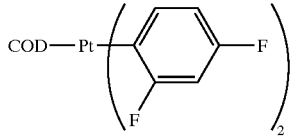

Photocatalyst F

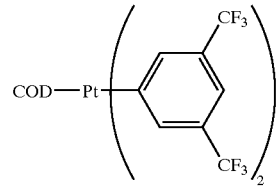

Photocatalyst G

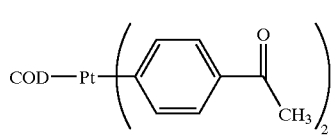

Photocatalyst H

Photocatalyst K is designated Catalog # 28,278-2 from Sigma-Aldrich (Milwaukee, Wis.).

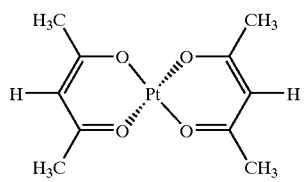

Photocatalyst K

Adhesion Measurement

A mechanical method for measuring separation of one material from another provides a discriminating test for adhesion of highly viscous sealants to solid substrates. Test results show the level of adhesion at the interface between a controlled amount of sealant, and the solid substrate to which it is applied. Measurements may be quantified in terms of the force required for interfacial separation along a given length of interface as follows:

Adhesion=Force Applied for Interfacial Separation/Length of the Interface

Measurement of the adhesive properties of highly viscous sealing gel samples is difficult to achieve because typical visco-elastic properties of sealant materials makes them compliant and hard to grip. A conventional approach to measuring adhesion of highly viscous sealants involves the use of peel tests. After attachment of a sealant to a test substrate, it is possible to run peel tests if one end of the sealing gel may be gripped, e.g. between a pair of mechanical jaws, and separated from the substrate while measuring the force of separation. This peel test method is effective for measuring adhesion only when the cohesive strength of the highly viscous sealing gel is greater than the adhesive strength at the interface sealant/substrate interface. When cohesion is less than adhesion the gel will fail cohesively giving an erroneous adhesion-to-substrate reading because the interface remains intact.

Figure 2:
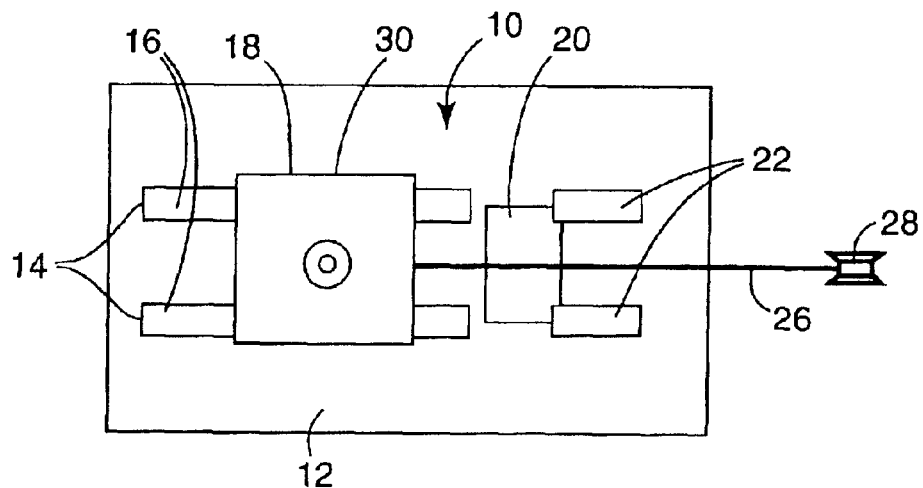
FIG. 2 is a schematic plan view of an apparatus useful for measuring adhesion of highly viscous gelled polymers to planar surfaces.

Interfacial adhesion measurement according to the present invention overcomes problems encountered with standard peel tests by concentrating the application of force at the demarcation line between a sealant layer of controlled dimensions and the substrate to which it is applied. FIG. 1 and FIG. 2 provide a schematic side view and schematic plan view respectively of equipment required to measure adhesion of highly viscous sealants to selected substrates, preferably plastic substrates. The equipment is a fixture 10 designed for use with conventional peel testing equipment such as a well-known Instron Peel Tester. A metal support 12 provides a fixed base for attachment of the test assembly that includes a pair of steel rails 14 having a surface layer 16 of low friction material such as TEFLON®. A low friction material 16, applied to the steel rails 14 facilitates horizontal movement of a plastic test block 18 positioned to slide along the rails 14 towards a knife-edge 20 that is secured between a pair of shortened beams 22. The knife-edge 20 may be a sharpened blade, such as a box cutter blade or razor blade, about 5.5 cm long, set at an angle of about 20° from horizontal. The sharpened edge of the knife-edge 20 lies in the same horizontal plane as the interface formed between the surface of the plastic test block 18 and a layer of highly viscous sealant (not shown). This arrangement concentrates the application of force to cause preferential crack initiation and disruption of adhesion at the interface between the sealant and the surface of the test block 18.

Movement of the plastic test block 18 along the steel rails 14 occurs through coupling the test block 18 to the vertically positioned load cell 24 of a conventional Instron taster. Mechanical or adhesive coupling may be achieved using a filament 26, such as a wire or string, tied between the load cell 24 and front top portion of the test block 18. The filament 26 passes over a rotary pulley 28 positioned in the path between the load cell 24 and the test block 18. Preferably the pulley 28 lies substantially in the same horizontal plane as the test block 18 to convert the vertical force produced by the Instron tester into a horizontal force needed to pull the test block 18 and attached sealant sample towards the knife edge 20. A weight 30, placed on the test block 18 contributes to smooth, even movement of the block 18 along the steel rails 14. Measurement of adhesion for samples according to the present invention required a tensile-compressive load cell 24 having a maximum capability of 150 g.

Adhesion data was collected, by recording the force applied to the load cell 24, for a selected sample displacement distance or a fixed amount of time, after contact between the knife-edge 20 and the highly viscous sealant sample. A stereo, low power microscope may optionally be placed to observe the knife edge 20 using about a 10× to 40× magnification to provide visual qualitative evidence of separation, by loss of adhesion, of sealant samples from the surface of the test block 18. Lack of planarity of the surface of test block 18, to which the sealant is applied, will introduce error into the measurement due to the probability that the knife-edge 20 will deflect from its intended position thereby penetrating the mass of sealant. This causes the data recorder to display the force to penetrate the sealant rather than the force of interfacial adhesion.

Figure 3:
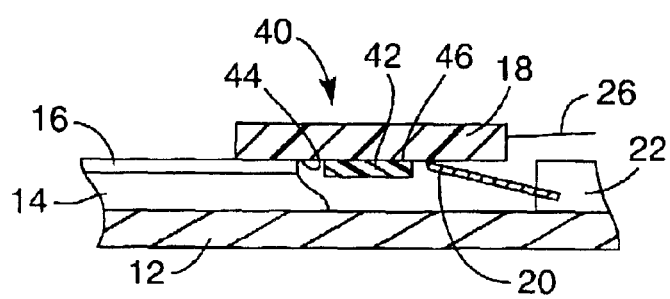
FIG. 3 is a partially cut-away cross sectional view showing positioning of a knife-edge and a mass of gelled polymer in preparation of adhesion measurement.

FIG. 3 provides a cross sectional schematic view of a test sample 40 according to the present invention including a rectangular, plastic test block 18 having a layer of highly viscous sealant 42 applied to a planar surface 44 of the test block 18. Adhesion measurement requires that the sample of highly viscous sealant 42 face downward towards the knife-edge 20. A test sample 40 preferably consists of the rectangular block 18 having a planar surface 44, approximately 20 cm long and 5 cm wide, and a layer, approximately 2.5 cm square, of highly viscous liquid sealant 42 placed approximately at the center of the longitudinal axis of the planar surface 44 so that the edges of the sealant square adopt a parallel relationship with the sides of the planar surface 44.

The test set-up requires an initial separation of about 5 mm between the viscous sealant 42 from the knife-edge 20. This provides a lead-in distance before the knife-edge 20 contacts the interface 46 marking the boundary between the viscous sealant 42 and the planar surface 44 of the plastic test block 18. The test set-up further requires a gap of no more than 0.1 mm between the knife-edge 20 and the planar surface 44 of the test block 18. In this position, the knife-edge 20 should disrupt interfacial contact between the viscous sealant 42 and the planar surface 44 rather than penetrate the bulk of the viscous sealant 42, which causes measurement error.

After initial set-up a test was conducted using a crosshead, attached to the load cell 24, which was set to move at a slow speed preferably of about 1.0 mm/min. Conversion of the vertical movement of the load cell 24, described previously, produced a resultant horizontal force and motion of the test sample 40 for contact with the knife-edge 20. It is preferred that sample preparation produce a layer of viscous sealant 42 that presents a clean advancing edge and substantially simultaneous contact of the sealant 42 at all points along the length of the knife-edge 20. Uniform contact of this type is effective for initially disrupting the adhesive bond and promoting separation of the viscous sealant 42 from the planar surface 44 as the test sample 40 traverses the knife-edge 20. In consideration of the visco-elastic response of the viscous sealant 42, it is important to use low crosshead speed to allow the crack, produced by adhesive bond disruption, to propagate along the interface 46, rather than deflect into the sealant 42 layer, which alters the measurement from one of adhesion to one of sealant penetration.

Movement of the test sample 40 over the knife-edge 20 was detected by monitoring equipment to produce a print-out corresponding to initial traversal of the 5 mm gap followed by an onset force in response to contact of the viscous sealant 42 with the knife-edge 20. The load increased to a maximum value as the sealant 42 separated from the interface 46. The adhesive force was calculated by subtracting the onset force from the maximum load value. Adhesion values may be expressed in terms of force per unit length e.g. grams/cm or Newtons/100 mm as reported herein.

EXAMPLE 1 TO EXAMPLE 8
Thermally Cured Gel Compositions

Table 1 provides compositions for curable silicone compositions containing a silicone oil (BAYSILONE fluids M40–M899 available from GE/Bayer Silicones GmbH, Leverkusen, Germany), a vinyl substituted polysiloxane (SILOPREN U65 available from GE/Bayer Silicones, Ekrath, Germany), a hydrogen substituted polysiloxane (HMS-301R available from Gelest Inc., Morrisville, Pa.), an inhibitor (e.g. 1,3,5,7-tetravinyl-,3,5,7-tetramethylcyclotetrasiloxane available from United Chemical Technologies, Inc. (UCT), Bristol, Pa.) and a thermally activated hydrosilation catalyst (Pt(0)-1,3-divinyl-1,1,3,3-tetramethyl disiloxane available from Aldrich Chemical Company Inc., Milwaukee, Wis.). The compositions are essentially duplicates containing about 10 ppm inhibitor and about 2 ppm catalyst. Values of adhesion, measured with reference to polycarbonate, show significant variation from as low as about 0.29 N/100 mm (8 g/in) to about 3.08 N/100 mm (80 g/in). Examples 6–8 show improvement in adhesion to plastic with increasing amount of thermally activated hydrosilation catalyst.

TABLE 1

Thermally Cured Sealant Compositions

|  | 1 | 2 | 3 | 4 | 5 |
|---|---|---|---|---|---|
| Vinyl siloxane wt % | 14.8% | 14.8% | 14.8% | 14.8% | 14.8% |
| Hydrogen siloxane wt % | 1.2% | 1.2% | 1.2% | 1.2% | 1.2% |
| Silicone Oil wt % | 84.0% | 84.0% | 84.0% | 84.0% | 84.0% |
| Inhibitor ppm | 10 ppm | 10 ppm | 10 ppm | 10 ppm | 290 ppm |
| Catalyst ppm | 2 ppm | 2 ppm | 2 ppm | 2 ppm | 88 ppm |
| Adhesion | 0.29 | 1.18 | 0.96 | 0.89 | 3.08 |
| N/100 mm (g/in) | (7.62) | (30.48) | (25) | (23) | (79.5) |

TABLE 1-continued

Thermally Cured Sealant Compositions

|  | 6 | 7 | 8 |
|---|---|---|---|
| Vinyl siloxane wt % | 14.8% | 14.8% | 14.8% |
| Hydrogen siloxane wt % | 1.2% | 1.2% | 1.2% |
| Silicone Oil wt % | 84.0% | 84.0% | 84.0% |
| Inhibitor ppm | 100 ppm | 200 ppm | 290 ppm |
| Catalyst ppm | 5 ppm | 25 ppm | 50 ppm |
| Adhesion N/100 mm (g/in) | 1.37 (36) | 1.94 (56.5) | 2.26 (59.6) |

EXAMPLE 9 TO EXAMPLE 16
Photocured Sealant Compositions

Table 2 provides compositions for curable silicone compositions containing a silicone oil (BAYSILONE fluids M40–M899 available from GE/Bayer Silicones GmbH, Leverkusen, Germany), a vinyl substituted polysiloxane (SILOPREN U65 available from GE/Bayer Silicones, Ekrath, Germany), a hydrogen substituted polysiloxane (HMS-301R available from Gelest Inc., Morrisville, Pa.), and a hydrosilation photocatalyst (Photocatalyst E). The compositions include duplicates and change in photocatalyst between about 8 ppm and about 80 ppm. Values of adhesion, measured with reference to polycarbonate, are higher than those obtained with thermally cured viscous sealants and measurements show less variability between about 2.0 N/100 mm (60 g/in) and about 4.0 N/100 mm (100 g/in). Photocured silicone compositions show the same trend towards increasing adhesion as the amount of catalyst in the photocurable sealant composition increases. Examples 14–16 provide adhesion results showing this trend.

TABLE 2

Photocured Sealant Compositions

|  | 9 | 10 | 11 | 12 | 13 |
|---|---|---|---|---|---|
| Vinyl siloxane wt % | 14.8% | 14.8% | 14.8% | 14.8% | 14.8% |
| Hydrogen siloxane wt % | 1.2% | 1.2% | 1.2% | 1.2% | 1.2% |
| Silicone Oil wt % | 84.0% | 84.0% | 84.0% | 84.0% | 84.0% |
| Catalyst ppm | 78 ppm | 78 ppm | 79 ppm | 7.7 ppm | 78 ppm |
| Adhesion N/100 mm (g/in) | 2.25 (58.42) | 3.82 (99.06) | 3.09 (80) | 3.51 (91) | 3.88 (100.5) |

|  | 14 | 15 | 16 |
|---|---|---|---|
| Vinyl siloxane wt % | 14.8% (2.99) | 14.8% (2.99) | 14.8% (2.96) |
| Hydrogen siloxane wt % | 1.2% (0.24) | 1.2% (0.24) | 1.2% (0.23) |
| Silicone Oil wt % | 84.0% (16.98) | 84.0% (16.98) | 84.0% (16.81) |
| Inhibitor ppm | 10 ppm | 10 ppm | 10 ppm |
| Catalyst ppm | 5 ppm | 25 ppm | 50 ppm |
| Adhesion N/100 mm (g/in) | 1.86 (49.5) | 2.81 (74.0) | 3.33 (87.5) |

EXAMPLE 17 AND EXAMPLE 18
Adhesion of Photocured Sealant Compositions to PBT Table 3 provides evidence that an increase in adhesion to plastic is not limited to polycarbonate resins but a similar increase occurs when adhesive compositions according to the present invention are photocured in contact with PBT.

TABLE 3

Adhesion to Polybutylene Terephthalate (PBT)

|  | 17 | 18 |
|---|---|---|
| Vinyl siloxane wt % | 14.8% | 14.8% |
| Hydrogen siloxane wt % | 1.2% | 1.2% |
| Silicone Oil wt % | 84.0% | 84.0% |
| Inhibitor ppm | 100 ppm | |
| Thermal Catalyst ppm | 5 ppm | |
| Photo-Catalyst ppm | | 5 ppm |
| Adhesion N/100 mm (g/in) | 1.94 (56.5) | 3.11 (90.5) |

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A molded wire connector comprising:

a connector body comprising a resin, said connector body having a cavity formed therein containing a curable, photosensitive silicone composition comprising:

a fluid polysiloxane polymer in an amount from about 80 wt % to about 90 wt %;

a vinyl group containing polyorganosiloxane in an amount from about 10 wt % to about 20 wt %;

a hydrogen containing polysiloxane in an amount from about 0.5 wt % to about 2.0 wt %; and a hydrosilation photocatalyst in an amount from about 5 ppm to about 100 ppm, said photosensitive silicone composition curing in about 1 second to about 20 seconds during reaction of said vinyl group containing polydiorganosiloxane and said hydrogen containing polysiloxane, by exposure to ultraviolet radiation, in the presence of said hydrosilation photocatalyst, said curable photosensitive silicone composition curing to a highly viscous sealant having an adhesion to plastic from about 2.0 Newtons/100 mm to about 4.0 Newtons/100 mm.

2. The molded wire connector of claim 1, wherein said resin is selected from the group consisting of polycarbonate resins and polybutylene terephthalate resins.

* * * * *